United States Patent [19]

Myers

[11] Patent Number: 4,751,535
[45] Date of Patent: Jun. 14, 1988

[54] COLOR-MATCHED PRINTING

[75] Inventor: Robin D. Myers, Livermore, Calif.

[73] Assignee: Xerox Corporation, Stamford, Conn.

[21] Appl. No.: 919,113

[22] Filed: Oct. 15, 1986

[51] Int. Cl.$^4$ .............................................. G01D 15/00
[52] U.S. Cl. ..................................... 346/157; 358/80
[58] Field of Search ................... 358/80, 75; 346/157; 355/4; 346/74.7, 204, 1.1; 364/518–521

[56] References Cited

U.S. PATENT DOCUMENTS

| | | | |
|---|---|---|---|
| 4,185,920 | 1/1980 | Suga | 356/406 |
| 4,413,275 | 11/1983 | Horiuchi et al. | 358/75 |
| 4,446,470 | 5/1984 | Sugiyama et al. | 346/140 R |
| 4,522,491 | 6/1985 | Ingalls et al. | 355/77 |
| 4,536,848 | 8/1985 | d'Entremont et al. | 364/526 |
| 4,670,780 | 6/1987 | McManus et al. | 358/80 |

FOREIGN PATENT DOCUMENTS

| | | | |
|---|---|---|---|
| 0142975 | 5/1985 | European Pat. Off. | |
| 121074 | 7/1984 | Japan | 355/4 |

OTHER PUBLICATIONS

Kinoshita, H., Miyake, Y., Tamoto, Y., and Kubo, S., "A New Evaluation Method of Image Quality of Digital Halftone Images Obtained by Ordered Dither Method", *Journal of Imaging Technology*, vol. 10, No. 5 (Oct. 1984), pp. 181–185.

Roetling, P. G., and Holladay, T. M., "Tone Reproduction and Screen Design for Pictorial Electrographic Printing", *Journal of Applied Photographic Engineering*, vol. 5, No. 4 (Fall 1979), pp. 179–182.

Wyszecki, G. and Stiles, W. S., *Color Science: Concepts and Methods, Quantitative Data and Formulae*, Second Ed., John Wiley & Sons, New York (1982), pp. 130–143.

Engeldrum, Peter G., "Four Color Reproduction Theory for Dot Formed Imaging Systems," *Second International Congress on Advances in Non-Impact Printing Technologies*, Nov. 4–8, 1984, Arlington, VA.

Starkweather, G. K., "A Color-Correction Scheme for Color Electronic Printers", *Color Research and Application*, vol. 11, Supplement (1986), pp. S67–S72.

Kenney, J., "Careful Color Matching Makes Hardcopy Output Conform to CRT Display", *Computer Technology Review*, Fall 1985, pp. 167–175.

*Raster Graphics Handbook*, Conrac Corp., Covina, Calif. (1980), pp. A3-1 through A3-37.

Foley, J. D. and Van Dam, A., *Fundamentals of Interactive Computer Graphics*, Addison–Wesley, Reading, Mass. (1982), pp. 453–455.

Hardy, A. C., *Handbook of Colorimetry*, Technology Press, Cambridge, Mass. (1936), pp. 29–31.

Kubo, S., "Continuous Color Presentation Using a Low-Cost Ink Jet Printer", *Frontiers in Computer Graphics: Proceedings of Computer Graphics Tokyo '84*, Springer-Verlag, Tokyo (1985), pp. 344–353.

*Primary Examiner*—Arthur G. Evans

[57] ABSTRACT

A technique is disclosed for matching a color, applicable for example to printing a color which matches a color on a CRT display. Quantities of toners which will generate the matching color are determined and then a pattern of toners which will approximate those quantities is applied. To determine the quantities, a definition of the original color, such as its RGB coordinates, is converted to coordinates in a linear mixing space, such as CIE coordinates. These coordinates, together with coordinates of the toners are then used to calculate quantities of toners which will produce a matching color. The calculations match hue, saturation and reflectance so that the matching color appears like the original color and so that characteristics of an original image are preserved. A table containing the area coverages of available toner patterns is used in selecting the toner pattern. A separate pattern for each toner may be selected by comparing the quantity of that toner with the area coverages of its available patterns to find the separate toner pattern which will come closest to that quantity. The selected separate patterns of the toners are then combined to obtain a combined toner pattern, which is then applied.

28 Claims, 13 Drawing Sheets

COLOR-MATCHED PRINTING

BACKGROUND OF THE INVENTION

The present invention relates to producing a color which matches an original color. For example, the invention may be used in printing a color which accurately matches a color displayed on a cathode-ray tube (CRT) display.

In order to produce a printed color corresponding to a CRT color, for example, it is necessary to convert the signals which generate the CRT color into signals controlling the printing process. The CRT color signals conventionally include three color coordinates for each distinct colored feature. Each feature could be a picture element, or pixel, or could be any other geometric shape, according to conventional image generating techniques applicable to CRT displays, to printing processes and to other color imaging techniques. The three coordinates may correspond, for example, to the primary colors produced by light emitting elements within each pixel. But these coordinates do not correspond to the toner colors used in printing, and therefore cannot be used directly to control the printing process.

One system of CRT color uses RGB coordinates corresponding to intensities of red, green and blue (RGB), the colors detected by cone cells on the retina of the human eye. These coordinates cause the light emitting elements to generate a CRT color additively, with light of the primary red, green and blue colors mixing to produce other colors. The mixture of all three primaries yields white at maximal intensity and black at minimal intensity. In addition, each pair of the RGB primaries mix to produce a color which can also serve as a primary, with red and green producing yellow, red and blue producing magenta, and blue and green producing cyan. The range of colors, or the color space, obtainable from the RGB coordinates may thus be graphically represented as a cube, with two diagonally opposite corners corresponding to black and white, and the intermediate corners corresponding to the primary colors, as shown in FIG. 1. FIG. 1 also shows the corners corresponding to the cyan, magenta and yellow (CMY) primary colors nearer to the white corner than the RGB primaries are, because each of the CMY primaries is produced by adding the light from two of the RGB primaries, and therefore is more intense and closer to white than the RGB primaries. This illustrates the generation of a color additively.

In contrast to a CRT display, a color printer generates an image subtractively, by applying toners to a white medium (or a transparent medium if back-lit), each toner absorbing some light frequencies and reflecting or transmitting others to produce its characteristic color. The toners commonly correspond to the CMY primary colors, with application of no toner producing white and all toners at maximal intensity producing black. Alternatively, black may be produced with a separate toner. The toners may be mixed by superimposing them or by mixing them in a pattern such as a dot pattern. Superimposing a pair of the CMY primaries produces an RGB primary which can also be used in printing. In general, the mixing of subtractive primaries produces colors within a space similar to the RGB color space of FIG. 1, but a mixed color produced by combining quantities of the primaries will be nearer the black corner of the color space than the same quantity of any of the primaries alone because each added primary will subtract more of the light frequencies than the white medium would.

One technique for converting CRT color signals into printer color signals is to directly convert each CRT color coordinate into coordinates for the pair of CMY primaries which mix to produce that coordinate. This does not accurately reproduce the CRT colors, however, because of spectral differences and because additive and subtractive images differ, as explained below.

The differences between additive and subtractive primaries can be understood by comparing spectral shapes. The intensity spectrum of each additive primary preferably has a narrow peak at the appropriate wavelength and an intensity of zero for other wavelengths. In contrast, the reflectance spectrum of each subtractive CMY primary, as shown for typical toners in FIGS. 2A-2C, spreads across a relatively broad range of wavelengths, and typically includes some light from nearly all wavelengths, with maximal reflectance of the two RGB primaries which additively produce that CMY primary. Therefore, even if mixing of two CMY primaries produces a subtractive RGB primary, the reflectance spectrum of that RGB primary will be much different than the intensity spectrum of a corresponding additive RGB primary. The subtractive primary looks different than the corresponding additive primary.

FIGS. 2A-2C also illustrate why additive and subtractive images differ. The values shown for reflectance are each equal to (1-absorption), so that many wavelengths are almost entirely absorbed, especially by the cyan and magenta toners. Therefore, mixing toners in a pattern will result in further absorption, producing a darker color than the primary toners which are mixed, as noted above. On the other hand, the additive CRT primaries, when mixed, produce a color of greater intensity than the primaries themselves, and the CRT provides colors of higher intensity than can be obtained by ordinary printing, in which the maximum possible intensity is the white of the paper surface. The intensity differences between additive and subtractive colors are another reason the CRT color coordinates cannot be directly converted to CMY coordinates.

A second technique for converting original color signals into printer color signals is described briefly in U.S. Pat. No. 4,446,470. This technique uses density measurements of the CMY primary toners to obtain a compensation matrix. For each original coordinate, the matrix provides a compensation constant to be multiplied with the coordinate to obtain an adjusted amount of each CMY primary toner to be printed. The density measurements are obtained from a solid print of the pure primary toner. Therefore, the measurements may not accurately reflect the manner in which the toners are applied by the printer. For example, the green produced by combining yellow and cyan may be bluish-green because the printer applies less yellow than expected in a pattern. The matrix does not take such variations into account.

A variation of this second technique, described in Starkweather, G. K., "A Color-Correction Scheme for Color Electronic Printers," *Color Research and Application*, Vol. 11, Supplement (1986), pp. S67–S72, is to use a large number (e.g. 512) of compensation matrices, each matrix being tuned to a small portion of the color gamut. This is still not satisfactory for high saturation colors, however, and requires lengthy, complex computation to generate the matrices. Furthermore, if a color shift occurs due to a change in toner spectrum, toner sequence, dot overlap, flare or paper characteristics, all of the matrices must be recalculated.

A third technique for converting CRT color signals into printer color signals is described in Kenney, J., "Careful Color Matching Makes Hardcopy Output Conform to CRT Display", *Computer Technology Review, Fall* 1985, pp. 167–175. This technique uses the CIE (Commission Internationale de l'Eclairage) system which assigns coordinates to colors according to their appearance under a standard illumination as viewed by a standard observer. Three coordinates are assigned to each other, but these coordinates are not other colors making up that color; rather, the coordinates represent a summation of the color contributions of all wavelengths within the spectrum of a color sample. These values are mathematically useful in relating measurements of wavelength and intensity to perceived colors. A color on a CRT display is matched by identifying its RGB components or coordinates, determining the corresponding CIE values, and defining the closest CMY mixture using a set of color lookup tables. Non-linear factors such as overlapping ink dots and absorption characteristics of the paper are then corrected. If changes are made in the toners or other printing parameters used in this technique, it would be necessary to develop a new set of color lookup tables.

U.S. Pat. No. 4,522,491 relates to an indirect technique which can be used to reproduce a target color in printed form, but which requires the use of photographic media during an intermediate stage. This technique makes use of coordinates similar to the CIE coordinates to select a period of illumination of the photographic media through each of a number of filters. In addition, the exposure times are adjusted using a correction factor based on color density measurements. This technique is therefore very complicated.

It would be advantageous to have a simple, accurate technique for directly matching printed colors to those on a CRT display which would not require a new set of matrices or tables whenever toner color changes. It would further be advantageous to have a technique which would reliably obtain a printed color closely approximating a CRT display color even when the displayed color is outside the gamut of printable colors.

SUMMARY OF THE INVENTION

The present invention provides a color matching technique which determines quantities of coloring agents which produce a color which matches an original color. The coloring agents are then applied in a pattern selected to approximate the determined quantities, and therefore to approximate the original color. This color matching technique may use tables, as in the selection of an application pattern, but does not require matrices or tables which depend on the color of each coloring agent and which would therefore need to be recalculated whenever a coloring agent changes. This aspect of the invention is based on the discovery that the quantities of coloring agents may be readily calculated from a definition of the original color, using a definition of each of the coloring agents to be applied rather than using matrices or tables which depend on the coloring agents.

The invention may be used with any suitable coloring agents, including dyes, inks, toners, pigments and CRT color phosphors, although the invention has been developed for providing printed toner patterns which match CRT display colors. Furthermore, the original color to be matched need not be actually displayed or otherwise made visible. It may, for example, be only sufficiently defined to permit the determination of its coordinates in a linear mixing color space such as the CIE color space. This aspect of the invention is based on the discovery of techniques for calculating the quantities of the coloring agents to be applied based on the liner mixing coordinates of the original color and of the coloring agents.

The techniques of the invention can be used to obtain a close match for any original color, even outside the gamut of colors available with the coloring agents being used. In matching a color outside the available gamut, the technique is flexible, permitting a number of variations which produce matching colors; each variation may be advantageous for a corresponding class of color matching problems, in which it is desirable to preserve a color characteristic of an original image. This aspect of the invention is based on the discovery of a number of ways of calculating the quantities of coloring agents in the matching color to approximate an original color outside the color gamut.

A method of generating a matching color according to the invention thus includes determining quantities of coloring agents to be applied to generate a color matching the original color, then applying the coloring agents in a pattern which approximates those quantities. The quantities may be determined from quantities of original coloring agents which generate the original color, such as quantities of additive RGB coloring agents like CRT phosphors. The pattern applied, which may for example be a pattern of dots, may be the one of a set of available patterns which most closely approximates the quantity of a coloring agent to be applied. A separate pattern may be selected for each coloring agent by comparing the quantity of that coloring agent with the area coverage percentages of available separate patterns for that coloring agent to find the closest area coverage percentage. The separate patterns for the coloring agents are then combined into a combined pattern which is applied to obtain the closest matching color.

An apparatus for generating a color matching an original color according to the invention includes means for determining the quantities of coloring agents to be applied to generate a color matching the original color, and also includes means for applying the matching coloring agents in a pattern which approximates those quantities. The quantities determining means includes means for obtaining quantities defining the original color, such as quantities of original coloring agents; coordinate determining means for determining from those quantities the linear mixing coordinates of the original color; and means for using the linear mixing coordinates of the original color and of at least three of the coloring agents to be applied to determine the coloring agent quantities. The apparatus may also include means storing an area coverage for each available pattern of each coloring agent. The applying means includes means for selecting a pattern which most closely approximates the determined quantity of a coloring agent, by retrieving the area coverages and comparing with the quantity of that coloring agent to find the most closely matching pattern.

A method of determining quantities of the coloring agents to be used to generate a matching color according to the invention includes determining linear mixing coordinates of the original color and then using those coordinates and the linear mixing coordinates of at least three of the coloring agents to be applied to determine the coloring agent quantities. The original color's linear mixing coordinates may be determined using the quantities of coloring agents which produce the original color. The original color's additive RGB coordinates, for example, may be converted into coordinates in a linear mixing color space such as the CIE color space.

Linear mixing coordinates of the coloring agents to be used may be determined in advance. If the coloring agents include three CMY coloring agents and three RGB coloring agents produced by combining the CMY coloring agents, for example, two of these six are then selected as primaries, and the relative quantities of those two primaries which will generate a pure hue matching the original color are calculated. This permits calculation of the quantities of the two primaries and the neutral coloring agents which will approximate the hue, saturation and reflectance of the original color. The hue, saturation and reflectance may be approximated in a manner which preserves the color characteristics of an original image which contains the original color.

The two-dimensional linear mixing coordinates of the coloring agents available as primaries will define a polygon, specifically a hexagon if six primaries are available. This hexagon can be divided into six mixing triangles by a center point inside the hexagon, each triangle having the center point as one vertex and the end points of one side of the hexagon as its other vertices. The center point may be at the coordinates of the neutral color with the same reflectance as the original color. These coordinates may be found based on the original color's coordinates and the coordinates of the white and black coloring agents, which are the end points of a mixing line which includes all the available neutral colors.

The matching color lies within one of the mixing triangles, which can be selected based on the coordinates of the center point and of the original color. Mathematically, a line projecting from the center point through the original color intersects a side of the selected mixing triangle. The intersection point defines a pure hue, undiluted with neutral colorants. The two primary colors at the end points of the intersected side can be mixed to obtain the pure hue, which matches the hue of the original color. The relative quantities of the primary colors making up the pure hue can be calculated from the lengths of the parts into which the intersected side is divided. Then, the relative quantities of the pure hue and the neutral coloring agents can similarly be calculated in a manner which preserves color characteristics of the original image.

These and other objects, features and advantages of the invention will be more fully apparent from the attached drawings together with the following description and claims.

DETAILED DESCRIPTION OF THE PREFERRED EMBODIMENTS

A. General Description

The present invention is based in part on the recognition that color matching involves two separable problems. The first problem is to determine the quantities of coloring agents which will produce a color matching the original color. The second is to determine a pattern of coloring agents which will provide those quantities.

The first of these problems becomes complicated if color changes occur in the coloring agents being used to produce the matching color. If one cyan toner, for example, is replaced with another which is closer to blue, then a different quantity of cyan toner is needed to produce the matching color. Similarly, color changes resulting from changes in temperature, humidity, paper or other causes may change the quantities of coloring agents which produce the matching color. Not all such color changes may justify a modification of the coloring agent quantities, of course, but it should be possible to take color changes into account in determining the quantities used to generate the matching color. Therefore, a satisfactory solution to this problem must accommodate color changes, whether the coloring agents are dyes, toners, inks, pigments, phosphors on a CRT, or others.

The second problem arises after the quantities of coloring agents to be used in generating the matching color have been determined. It involves selecting from the available patterns of coloring agents the pattern which will most closely approximate those coloring agent quantities. Although this selection will not be affected by color changes in the coloring agents, it will be affected by changes in the equipment used to apply the coloring agents, whether a printer, plotter, CRT or other equipment and also by changes in the surface characteristics of the medium to which the coloring agents are applied. It may also be affected by changes in the application characteristics of the coloring agents, such as changes in the viscosity of a toner or changes in the apparent size of a phosphor. Typically, these coloring agent changes may be neglected, however, so that the selection of the pattern of coloring agents will be stable for a specific piece of equipment applying coloring agents to a specific medium. Therefore, flexibility is typically not as important in the solution of this second problem, even though selecting a coloring agent pattern appropriate to the equipment and the medium being used is very important.

Figure 3:
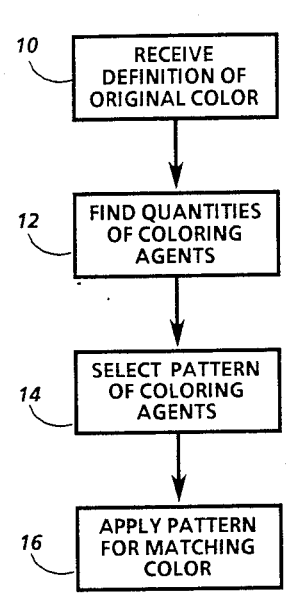
FIG. 3 is a functional block diagram showing the broad functions of color matching according to the invention.

FIG. 3 illustrates the broad functions of color matching according to the invention. A definition of the original color is received, in box 10. Typically, this will be a set of numbers reflecting quantities of coloring agents which generate the original color. These quantities provide the information necessary to obtain a matching color, so that they should be expressed in a standard form such as the quantities of additive RGB phosphors in a pixel, the output of a calibrated colorimetric scanner, or another form which fully specifies the original color.

The definition of the original color is then used in box 12 to determine the quantities of the coloring agents to be applied which will produce a matching color. The matching color may not be exactly the same as the original color, but it should closely approximate the original color and will ideally preserve color characteristics of an original image containing the original color, when viewed with matching colors in other parts of the image. Techniques for obtaining the optimal quantities of the coloring agents are discussed in more detail below.

The coloring agent quantities are used in box 14 to select a pattern of the coloring agents which, of the available patterns, most closely approximates those quantities. Because a limited number of patterns will typically be available, the precise quantities usually cannot be obtained, but this step selects the pattern which comes closest to those quantities. Then, in box 16, the coloring agents are applied in the selected pattern to generate the matching color.

The technique of FIG. 3 may be implemented in many ways. We turn now to a specific implementation which also makes use of a novel technique for the step in box 12.

B. Color matching method

A central problem in implementing the technique of FIG. 3 is to accurately determine the coloring agent quantities which will generate a color matching the original color. As noted above, it is desirable that the coloring agent quantities be determined without using a matrix or table which depends on the specific coloring agents, so that adjustments can be made for color changes in the coloring agents without recalculating all the values in the matrix or table. One aspect of the invention is based on the discovery of a computational technique which accurately determines coloring agent quantities directly from the definition of the original color. The inventive computational technique makes use of linear mixing coordinates to convert the original color's numerical definition into coloring agent quantities.

Figure 1:
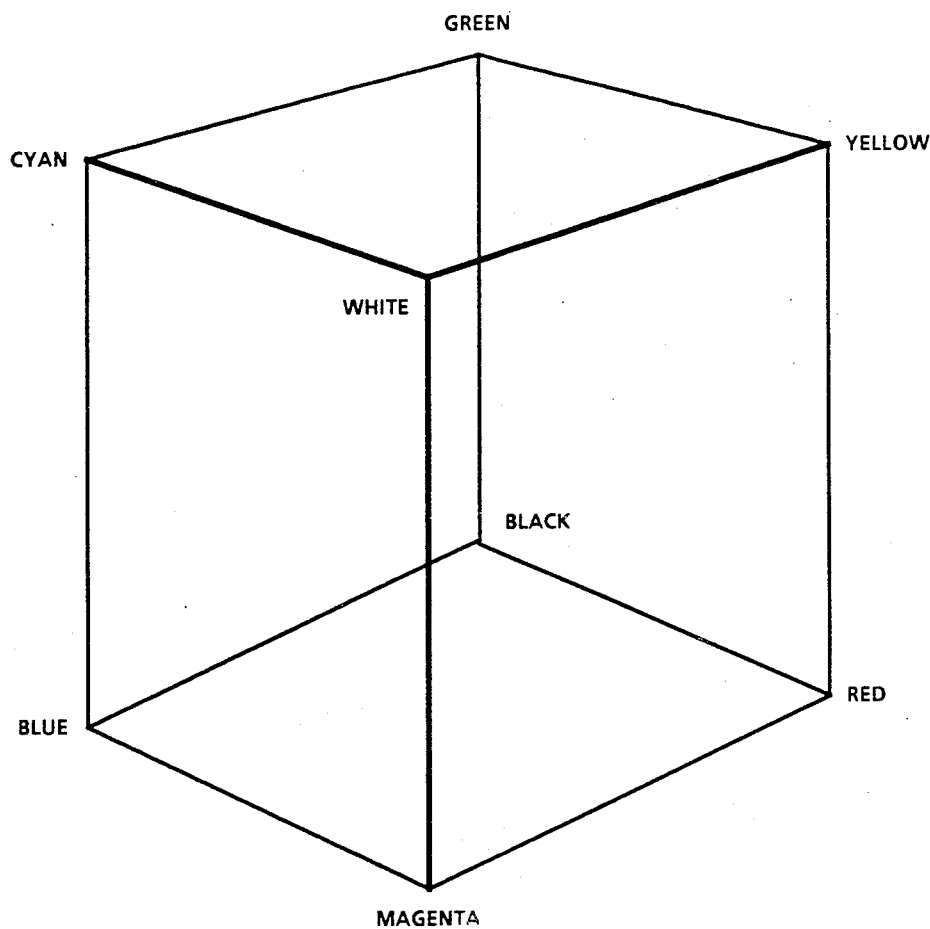
FIG. 1 is a graph showing the conventional RGB color space.
Figure 2A:
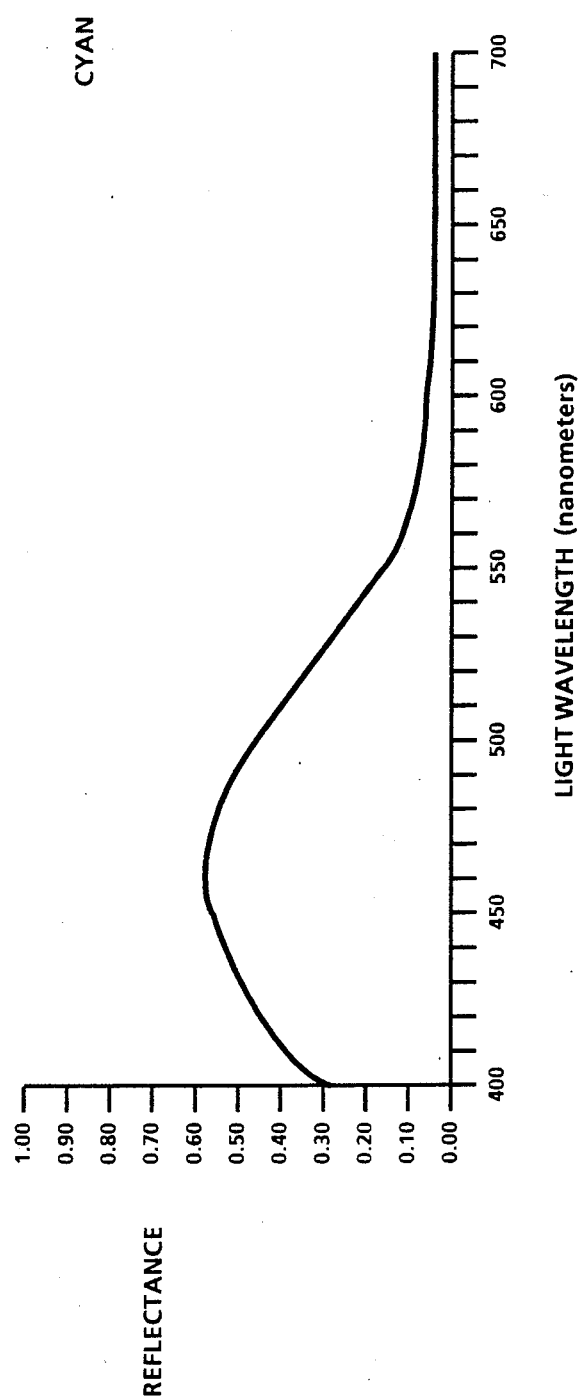
FIGS. 2A–2C are graphs of the reflectance spectra of typical CMY coloring agents, with FIG. 2A being that of cyan, FIG. 2B that of magenta and FIG. 2C that of yellow.
Figure 2B:
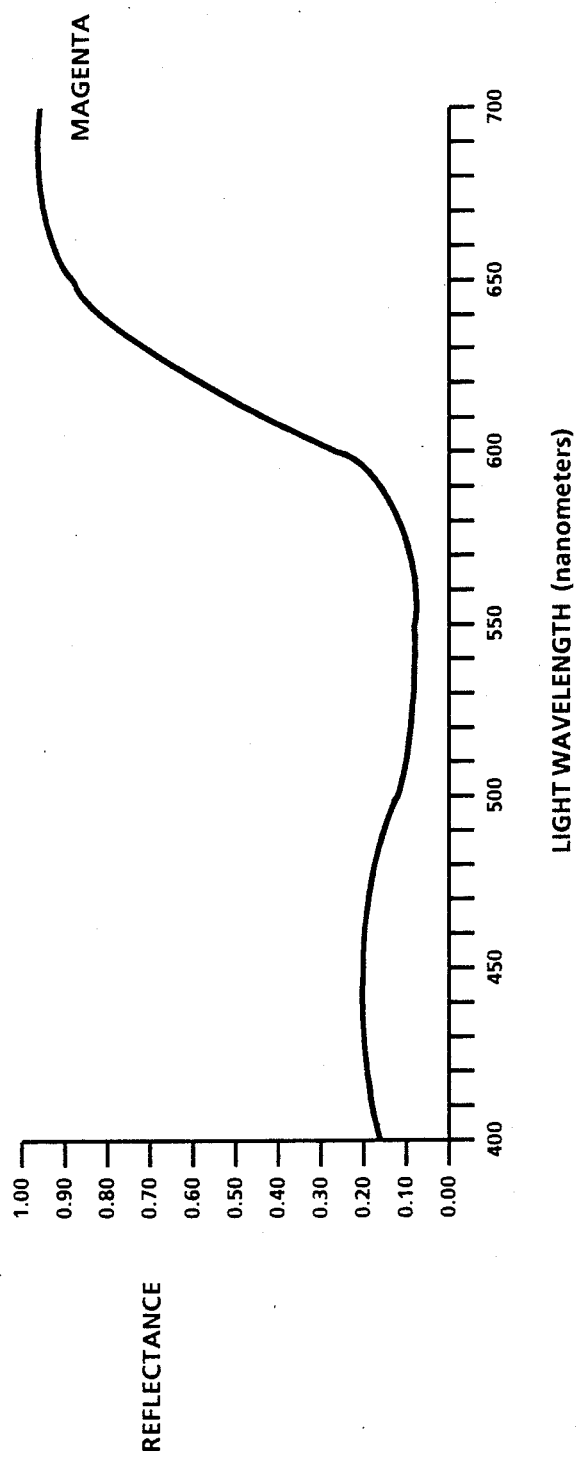
Figure 2C:
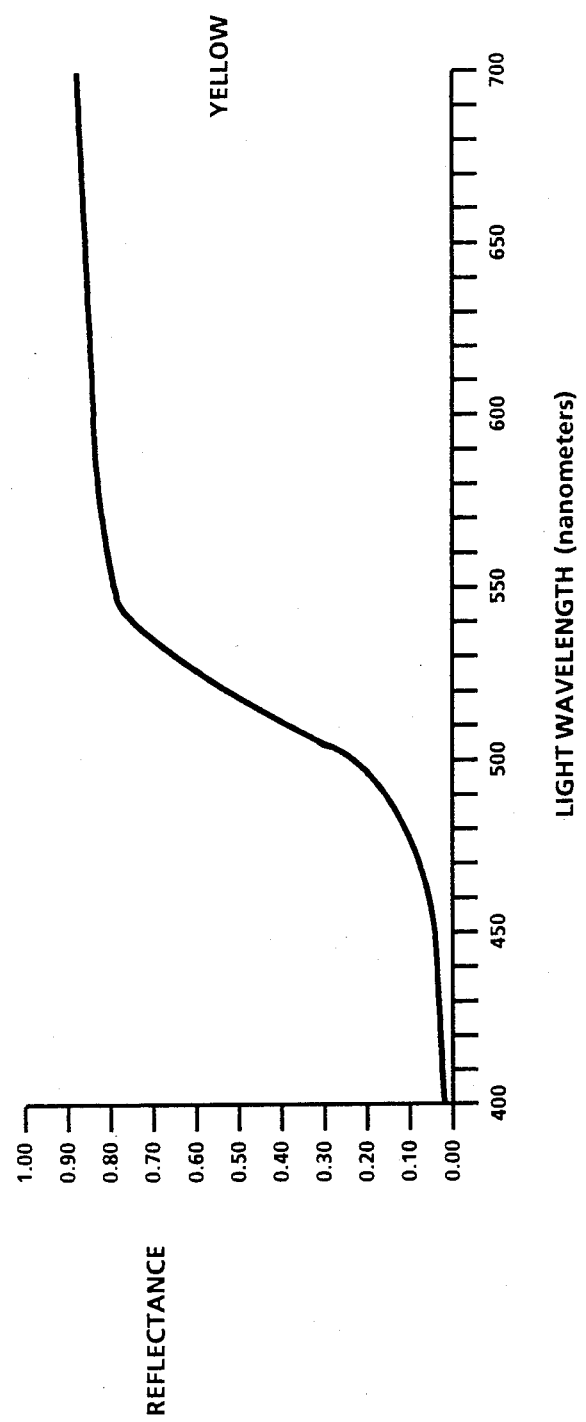
Figure 4:
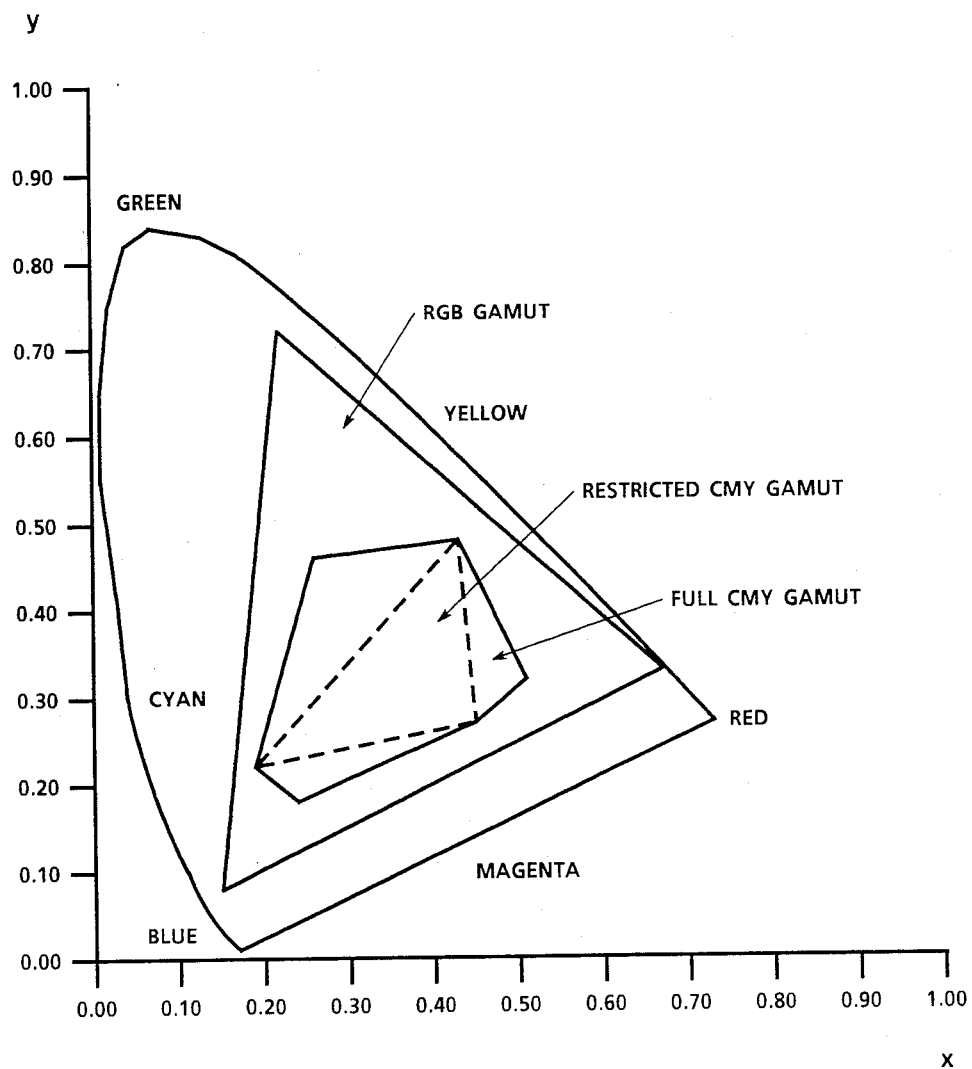
FIG. 4 is a graph of a plane from the conventional CIE color space, showing RGB and CMY color gamuts.
Figure 5:
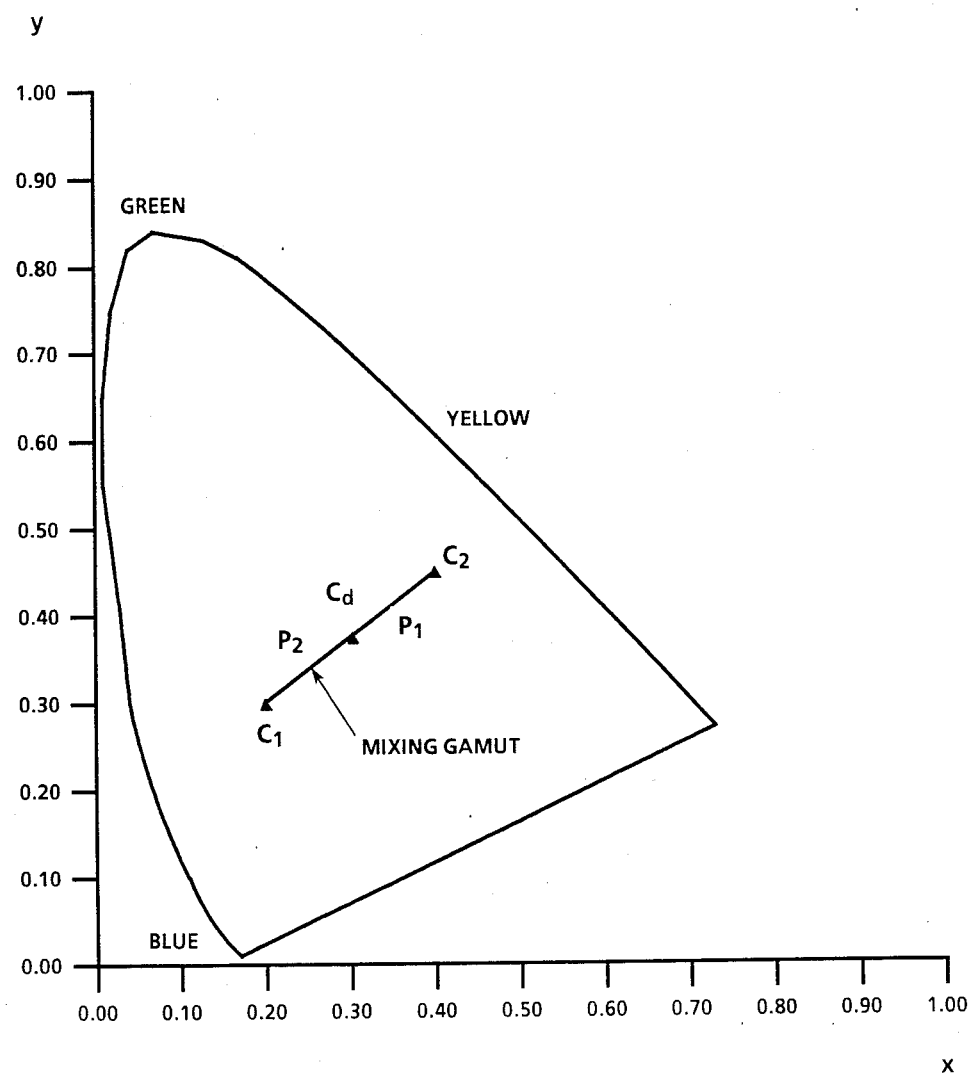
FIG. 5 is a graph showing how the plane of FIG. 4 serves as a linear mixing plane.

FIGS. 4 and 5 illustrate linear mixing coordinates within the CIE color space, which is one example of a linear mixing color space. While some other color spaces, such as the RGB cubic color space of FIG. 1, are based on arbitrary mathematical models of color, the CIE color space is based on the actual response of the human eye-brain system to color. The CIE color space relies on a model, created in 1931, which defines color based in part on characteristics of the human perceptual system. For example, since colors are perceived differently in different parts of the human field of vision, the 1931 CIE model defined an observer as having the color response functions of an area within 2 degrees of arc of the center of vision. The colored object is illuminated by a standard light source. And the resulting perceived colors are mapped into a linear mixing color space, meaning that it obeys the rule that the mixing of two colors will result in another color along the line between those two colors, its position on this mixing line being linearly dependent on the relative quantities of the two colors being mixed.

FIG. 4 shows a cross section of the CIE color space taken parallel to the x and y axes. The third axis, the Y axis, is orthogonal to the x and y axes and measures reflectance only, not hue or saturation, so that the x and y coordinates shown on the axes of FIG. 4 are sufficient to define any hue within the CIE color space. Within the cross section shown, the hues of the conventional RGB gamut and of a typical CMY gamut are outlined, and FIG. 4 shows that each of these gamuts is a subset of the hues within the CIE color space. Therefore, if the original color definition received in box 10 includes additive RGB quantities, those quantities correspond to a point in the CIE color space with x, y, and Y coordinates, the hue of which is completely specified by the x and y coordinates.

FIG. 5 shows how color mixing may be performed in the CIE color space. Unlike the RGB color space of FIG. 1, the CIE color space is a linear mixing color space in which the mixing of two colors such as $C_1$ and $C_2$ produces a color along the line between $C_1$ and $C_2$ and spaced from them according to their relative quantities. In other words, the ratio between the distances $P_1$ and $P_2$ will be the same as the ratio between the quantities of the colors $C_1$ and $C_2$.

Applying the relationship shown in FIG. 5 to the RGB and CMY gamuts shown in FIG. 4, it is apparent that mixing the colors at the vertices of one of the gamuts can generate only the colors within that gamut. The RGB gamut, based on the additive RGB phosphors of a CRT display, has three vertices, red, green and blue, and all the colors available with those phosphors fall within the triangle defined by those vertices. The CMY gamut, based on three subtractive CMY primaries and three subtractive RGB primaries obtained by superimposing CMY primaries, has six vertices, and all the colors available with those primaries fall within the hexagon defined by those vertices.

FIG. 4 also illustrates that the color obtained by superimposing two primaries is not necessarily the same as would be obtained by mixing those two primaries in a pattern such as a dot pattern. The RGB primaries obtained by superimposing CMY primaries having transparent properties are not on the lines between the CMY primaries, shown as dashed lines, but rather fall outside those lines, providing a greater gamut than the restricted triangular gamut within the dashed lines which would be available by mixing only the three CMY primaries in patterns. Also, if the CMY primaries were completely opaque rather than somewhat transparent, only the restricted triangular gamut would be available.

As used herein, "mixing" refers to the mixing of two or more coloring agents in adjacent areas of a pattern, with negligible superimposition. It will be understood that the dots or other areas of the pattern which contain distinct coloring agents must be small enough to be below the resolution limit of the human eye, so that the pattern is perceived as having a single color. The manner in which patterns are selected to approximate the coloring agent quantities is discussed in greater detail below.

Considering FIGS. 4 and 5 together, we can develop equations for obtaining a desired color $C_d$ from quantities of two coloring agents $C_1$ and $C_2$ based on the lengths of the parts $P_1$ and $P_2$ of the linear mixing line between $C_1$ and $C_2$. If $C_1$ and $C_2$ are independent coloring agents which are not superimposed, then:

$$A_1/A_2 = P_1/P_2,$$

where $A_1$ and $A_2$ are the areas occupied by each of the colors $C_1$ and $C_2$, respectively, within a pattern in which they are mixed to obtain $C_d$. In short, $P_1$ and $P_2$ are proportional to the respective areas which $C_1$ and $C_2$ occupy.

If $C_1$ is an independent coloring agent, but $C_2$ is obtained by superimposition of $C_1$ and another independent coloring agent $C_3$, as occurs when one of the subtractive CMY primaries is mixed in a pattern with an adjacent subtractive RGB primary, then:

$$A_1/A_3 = (P_1 + P_2)/P_2,$$

in which $A_3$ is the area occupied by $C_3$. This is true because $A_1$ includes an area $A_1'$ occupied solely by the color $C_1$ and also includes the area $A_2$ occupied by the color $C_2$, while $A_3$ includes only $A_2$.

Figure 6:
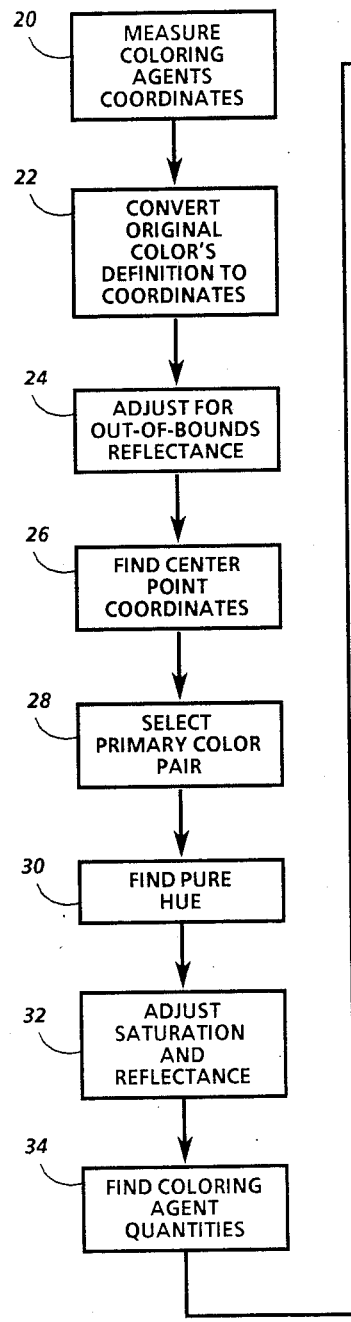
FIG. 6 is a flowchart of the general steps of color matching according to the invention.

FIG. 6 shows one technique according to the invention for determining coloring agent quantities making use of linear mixing as can be done in CIE color space. The technique begins with a preliminary step in box 20, the measuring and storing of the coordinates of the coloring agents which will be used to generate the matching image. Although the coordinates could be in any appropriate color space, they are preferably the coordinates of each coloring agent in a linear mixing color space such as the CIE coordinates. Rather than measuring these coordinates each time an image is generated, it typically suffices to measure and store the coordinates of a representative sample of each coloring agent in advance, provided the variation about the measured values is relatively small. The actual measurement of the coordinates, however, is important because estimation of the coordinates, especially for the subtractive RGB primaries obtained by superimposition, is highly speculative and the coordinates depend on the composition and other characteristics of the coloring agents. Therefore, it is highly preferable to obtain accurate colorimetric measurements of each coloring agent which will be applied. For example, Table I shows actual measured CIE coordinates of a set of coloring agents used in one electrostatic printer.

TABLE I

SAMPLE COORDINATES

| Color Name | CIE Coordinates | | |
|---|---|---|---|
| | x | y | Y |
| Blue | 0.2425 | 0.1869 | 0.0684 |
| Cyan | 0.1840 | 0.2123 | 0.2638 |
| Green | 0.2571 | 0.4592 | 0.2073 |
| Yellow | 0.4320 | 0.4831 | 0.7589 |
| Red | 0.5086 | 0.3158 | 0.1994 |
| Magenta | 0.4540 | 0.2656 | 0.1996 |
| White (paper) | 0.3158 | 0.3217 | 0.8361 |
| Black | 0.3155 | 0.3123 | 0.0467 |

The definition of the original color received in box 10 in FIG. 3 leads to the remaining steps in the technique of FIG. 6. The step in box 22 converts the original color's definition to coordinates in the same color space as those measured and stored in box 20. If the definition is expressed as quantities of additive RGB colors which generate the original color, for example, standard techniques are well known for converting such quantities of CIE coordinates. See, for example, Wyszecki, G. and Stiles, W. S., *Color Science, Concepts and Methods, Quantitative Data and Formulae,* Second Ed., John Wiley and Sons, New York, 1982 and *Raster Graphics Handbook,* Conrac Corp., Covina, Calif., 1980.

To convert RGB coordinates to CIE coordinates, one approach would be to first obtain chromaticity coordinates using reference illuminant D65, a 2 degree observer, CIE 1931, and Conrac typical graphic monitor phosphors:

$$C_x = 0.4762R + 0.2990G + 0.1747B,$$

$$C_y = 0.1747R + 0.6561G + 0.0815B,$$

$$C_z = 0.0197R + 0.1607G + 0.9086B$$

and $$C_t = C_x + C_y + C_z,$$

where $C_t$ is the total chromaticity. If $C_t$ is greater than zero, the CIE coordinates may then be calculated conventionally as $x_o = C_x/C_t$, $Y_o = C_y/C_t$ and $Y_o = C_y$. But if the total chromaticity $C_t$ is less than zero, it is appropriate instead to treat the original color as having the CIE coordinates $X_b$, yb and $Y_b$ of the black coloring agent to be applied. Furthermore, if the difference between the highest and lowest RGB coordinates is less than the smallest possible difference between shades of black, the original color is achromatic, and it is appropriate to proceed directly to calculate the quantity of black coloring agent, which will be $a_b = (Y_o - Y_w)/(Y_b - Y_w)$, but must be between zero and one. Ordinarily, however, this shortcut will be inapplicable.

Assuming that the original color is chromatic, the coordinates in a linear mixing color space of both the original color and the coloring agents to be applied are known, but it is still necessary to convert the original color's coordinates into quantities of the coloring agents. More than two coloring agents will typically be needed because the original color will rarely fall precisely on one of the linear mixing lines between two of the coloring agents. The original color will sometimes fall outside of the three-dimensional gamut of colors which can be obtained by mixing the coloring agents, so that the conversion technique must obtain coloring agent quantities which generate an appropriate approximation of the original color. The next several steps in the technique of FIG. 6 solve these problems and determine coloring agent quantities based on the coordinates of the original color and the coordinates of the coloring agents to be applied.

The step in box 24 adjusts for out-of-bounds reflectance values, which occur when an original color is lower in reflectance than the black coloring agent or higher in reflectance than the white coloring agent. This adjustment could be done in any of several ways. For example, if the reflectance is lower than black, the quantity of the black coloring agent could be set to maximum, and if the reflectance is higher than white, the quantity of the white coloring agent could be set to maximum, so that original colors with out-of-bounds reflectances are matched with either black or white. This approach does not preserve any of the color variations between original colors with out-of-bounds reflectances, however. An approach which is preferable because it preserves such variations is to compare the reflectance of the original color $Y_o$ with those of the white and black coloring agents; if it is less than the reflectance of black, it is made equal to the black reflectance $Y_b$, but if it exceeds the reflectance of white, it is made equal to the white reflectance $Y_w$. Another approach is to scale all the reflectances linearly into the reflectance range between the black and white coloring agents.

In boxes 26–34, the technique of FIG. 6 breaks down the problem of determining the coloring agent quantities into two parts, each involving linear mixing in a plane. First, a color referred to as the pure hue is found in a linear mixing plane like that shown in FIGS. 4 and 5. Then, saturation and reflectance are adjusted in a linear mixing plane which includes the pure hue and the neutral coloring agents, white and black. In addition, the technique of FIG. 6 makes use of the fact that any color within the available gamut can be obtained by mixing at most four coloring agents—two of the primary colors at adjacent vertices of the hexagon in FIG. 4 and the two neutral coloring agents.

Figure 7:
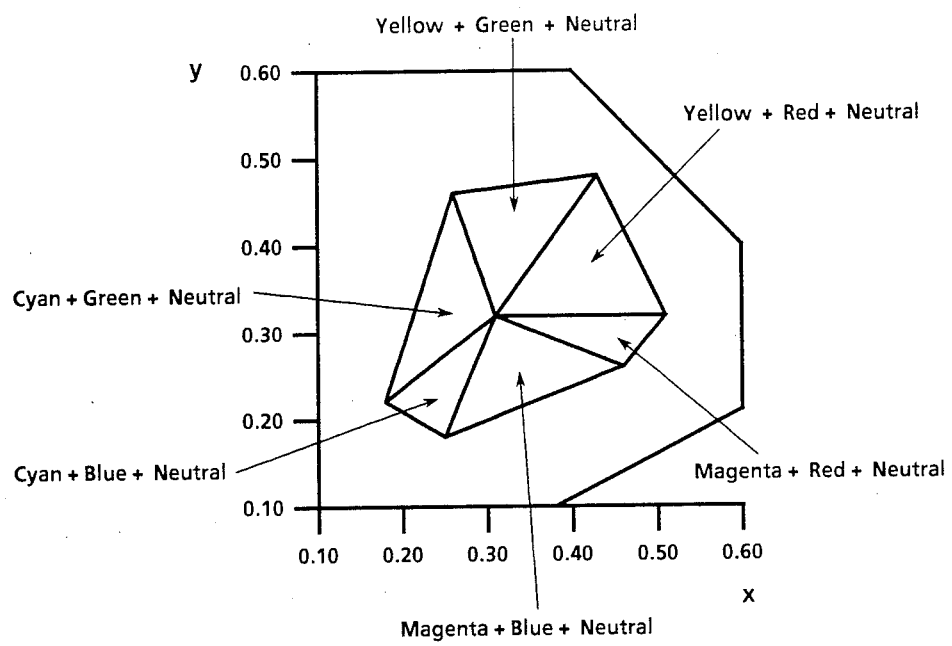
FIG. 7 is a graph showing a portion of the CIE plane of FIG. 4, showing the CMY color gamut divided into color mixing triangles.

FIG. 7 shows the hexagonal CMY color gamut of FIG. 4 divided into six color mixing triangles. Each triangle has as its base one side of the hexagon, with one of its base vertices being at the x, y coordinates of one of the subtractive CMY primaries and the other at the x, y coordinates of one of the subtractive RGB primaries. The third vertex of each color mixing triangle is a center point, preferably at the x, y coordinates of a neutral color, a color obtainable by mixing only the neutral coloring agents, white and black, without any of the other coloring agents.

The available neutral colors range in reflectance from the white of the paper to the pure black of the black coloring agent. As shown in Table I, however, the x and y coordinates of these two extremes of reflectance may not be exactly the same. If they are treated as the ends of the reflectance axis of the three-dimensional gamut of available colors, the reflectance axis will be skewed somewhat in relation to the Y axis of the CIE color space. The colors along the neutral mixing line between the white and black coloring agents are the only available neutral colors which can be generated using only white and black.

The step in box 26 in FIG. 6 determines the x, y coordinates of a center point on the neutral mixing line to be used in determining which pair of primary colors will be mixed to generate a matching color. The preferred center point is at the coordinates of the neutral color which has the same reflectance as the original color, because it yields an accurate choice of the two primary colors which, when mixed with the neutral coloring agents, white and black, will produce a color most closely matching the original color. This center point is also consistent with the preferred technique described below for adjusting saturation and reflectance to preserve color characteristics of an original image.

The coordinates of this neutral color can be calculated by first calculating the relative position of the original color's reflectance along the mixing line between the neutral coloring agents, white and black. The relative position $t_n$ of this neutral color can be obtained from the reflectances of the original color and the neutral coloring agents as follows:

$$t_n = (Y_o - Y_b)/(Y_w - Y_b),$$

where $Y_o$, $Y_b$, and $Y_w$ are the reflectances or Y coordinates of the original color, the black coloring agent and the white coloring agent, respectively. $Y_o$ may have been adjusted in the step of box 24, as described above.

At this point, $x_n$ and $y_n$, the x, y coordinates of the neutral color having the original color's reflectance, can be calculated as follows:

$$x_n = x_b + t_n(x_w - x_b),$$

$$y_n = y_b + t_n(y_w - y_b),$$

where the subscripts follow the same convention as above.

A number of other approaches could be used in selecting the center point, including using the x, y coordinates of the white coloring agent or of the black coloring agent. Indeed, both of these could be used, and if they result in selection of different pairs of primary colors or in substantially different proportions of matching coloring agents, an additional procedure may be used to determine which pair of primary colors or which proportions generate a matching color closer to the original color. For simplicity and accuracy, however, it is preferred to use the x, y coordinates of the neutral color having the original color's reflectance, as calculated above, as the center point coordinates.

As noted above, FIG. 7 shows that the colors within each of the color mixing triangles can be obtained by mixing the two primaries corresponding to the base vertices of that triangle with the neutral coloring agents, white and black. The center point coordinates from box 26, in FIG. 6 make it possible to select the pair of primary colors corresponding to the base vertices which can be mixed to obtain the matching color, in box 28. Geometrically, a line projecting from the center point through the original color will intersect the base of one of the color mixing triangles, with the original color falling within the angle between the two primary colors at the ends of that base. Therefore, the appropriate pair of primary colors may be selected mathematically by going in a clockwise or counterclockwise direction around the hexagon and testing at each primary color whether the original color is at an angle ahead of or behind that primary color. The primary color at which the original color makes a transition by changing from being ahead to being behind is one primary color, and the previous primary color in the testing sequence is the other. The projecting line will intersect the line between these two primaries.

Figure 8:
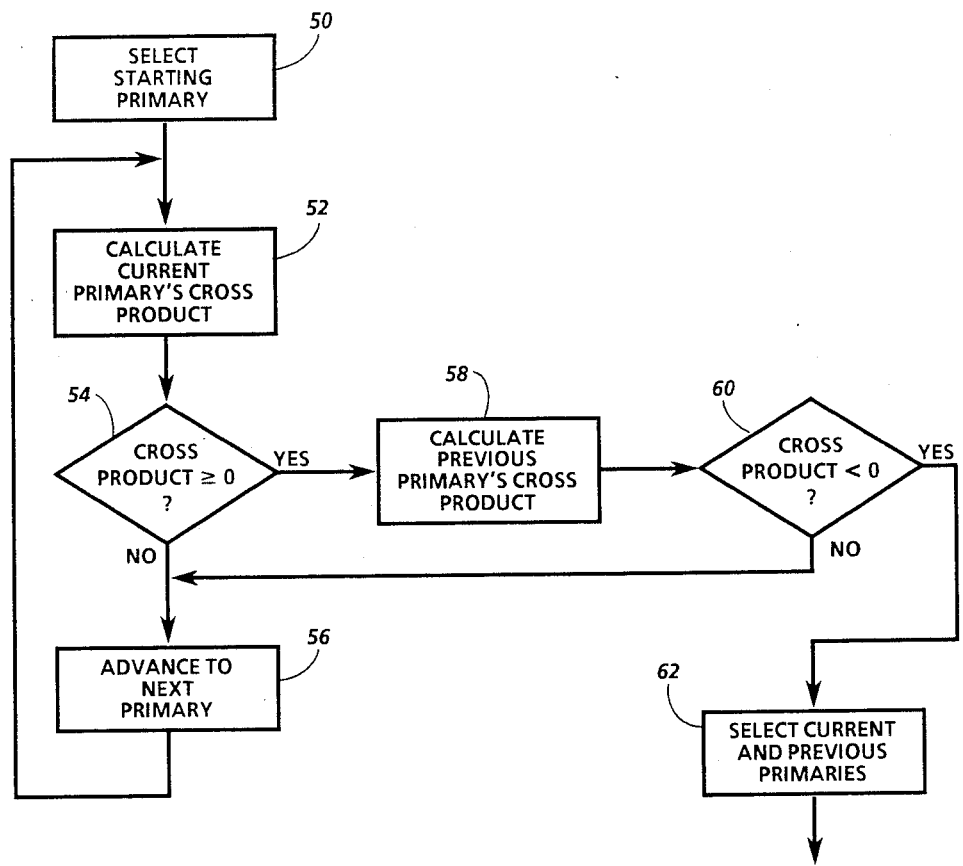
FIG. 8 is a flowchart showing the steps of selecting one of the color mixing triangles of FIG. 7.

FIG. 8 shows a routine which can be used to select the first and second primary colors in box 28, by going around the hexagon, mathematically testing each primary color in sequence to determine whether the original color changes from being ahead to being behind at that primary. In box 50, a primary color is selected to be tested first. This selection may be based on the RGB coordinates of the original color, with the lowest of the RGB coordinates indicating the complement of the CMY coloring agent highest in quantity. Therefore, the starting primary is preferably a coloring agent which precedes the highest CMY coloring agent in the testing sequence, to expedite finding the transition of the original color. For example, if the lowest of the RGB coordinates is red, then the highest of the CMY coloring agents is probably cyan, the complement of red, and the selected starting primary would be blue or magenta, which precede cyan as one proceeds in the clockwise direction around the hexagon.

The cross product of the current primary being tested and the original color is calculated in box 52. This cross product is the vector cross product of two vectors, the first from the center point to the original color and the second from the center point to the primary being tested. The vector cross product yields a third vector, perpendicular to the plane of FIG. 7, whose magnitude will be positive when the first vector is to the left of the second vector and negative when the first vector is to the right of the second vector. See Foley, J. and Van Dam, A., *Fundamentals of Interactive Computer Graphics*, Addison-Wesley, Reading, Mass., 1984, pp. 453–455. The cross product magnitude CP may be calculated for each primary color as follows:

$$CP = U_x V_y - U_y V_x,$$

where $U_x = X_{primary} - X_n,$
$U_y = Y_{primary} - Y_n,$
$V_x = X_o - X_n,$ and
$V_y = Y_o - Y_n,$ in which $X_{primary}$ and $Y_{primary}$ are the x,y coordinates of that primary color and the other coordinates have the same meanings as set forth above. The cross product magnitude CP is then compared with zero in box 54, and if it is less than zero, the routine proceeds to the next primary color in box 56 and returns to box 52. If the cross product is greater than or equal to zero, however, then the original color might be within the preceding angle. The previous primary's cross product is calculated in box 58 and is compared with zero in box 60. If it is not less than zero, the original color is not within the preceding angle, so the routine proceeds to the next primary color in box 56. If the previous primary's cross product is negative, however, then the original color is within the preceding angle and the primary being tested and the previous primary are selected in box 62 as the pair of primary colors which will be mixed to generate the matching color. When a pair of primaries has been selected, the routine proceeds to box 30 in FIG. 6.

The step in box 30 finds the pure hue, the pure hue being a color of the same hue as the original color which can be generated without any neutral coloring agents. In other words the pure hue falls on the linear mixing line between two of the primary coloring agents, the two selected as described above. Once the pure hue is found, it can be adjusted in box 32 by the addition of neutral coloring agents. Its saturation, which corresponds to the distance from the center point of the hexagon and is maximum at the mixing line between the primaries, can be decreased by adding the neutral coloring agents in appropriate quantities. Its reflectance, corresponding to its position along an axis perpendicular to the plane of the hexagon can be increased by adding white or decreased by adding black. Thus the generation of the matching color involves matching the hue, saturation and reflectance of the original color.

The hue of the original color corresponds to the angular orientation of a line projecting from the center point through the two-dimensional coordinates of the original color. All the points on this line share the same hue, and one of these points is at the intersection of the projecting line and the linear mixing line between the two selected primary colors. Therefore, the pure hue is found by determining the relative quantities of the two selected primaries which generate it, based on the position of the intersection point along the linear mixing line.

Figure 9:
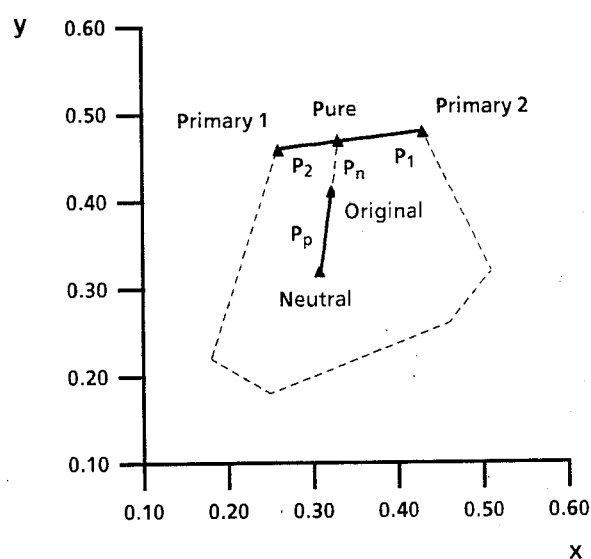
FIG. 9 is a graph showing a portion of the CIE plane of FIG. 4, showing how the quantities of coloring agents are determined.

FIG. 9 illustrates geometrically how the relative quantities of the selected primaries in the pure hue are calculated. The relative quantities can be calculated from the lengths of the parts into which the intersection point divides the linear mixing line, but those lengths are not previously known. Therefore, a useful intermediate step is to calculate the x, y coordinates of the intersection point corresponding to the pure hue. FIG. 9 shows the line projecting from the center point through the original color and the intersection point of that line with the linear mixing line. As discussed above, the center point preferably has the coordinates of the neutral color having the same reflectance as the original color. The pure hue's coordinates $x_p$ and $y_p$ may therefore be obtained by simultaneously solving for $x_p$ and $y_p$ in the slope equations for the two intersecting lines:

$$(x_p - x_{primary1})/(y_p - y_{primary1}) = d_{x1}/d_{y1}$$

and $$(x_p - x_n)/(y_p - y_n) = d_{x2}/d_{y2}$$

where $d_{x1} = x_{primary2} - x_{primary1},$
$d_{y1} = y_{primary2} - y_{primary1},$
$d_{x2} = x_o - x_n,$ and
$d_{y2} = y_o - y_n.$ The resulting equations for $x_p$ and $y_p$ are:

$$x_p = x_{primary1} + t_p d_{x1},$$

and $$y_p = y_{primary1} + t_p d_{y1},$$

where $$t_p = [(y_n - y_{primary1})d_{x2} - (x_n - x_{primary1})d_{y2}]/(d_{y1}d_{x2} - d_{x1}d_{y2}).$$

The step in box 30 also includes finding the relative quantities $P_1$ and $P_2$ of the first and second primary colors, respectively, which generate the pure hue. As noted above in relation to FIGS. 4 and 5, these relative quantities have the same ratio as the lengths of the parts of the linear mixing line. Therefore, the relative quantities can be calculated as fractions of the total length of the linear mixing line as follows:

$$P_1 = [(x_{primary2} - x_p)^2 + (y_{primary2} - y_p)^2]^{0.5} \div [(x_{primary1} - x_{primary2})^2 + (y_{primary1} - y_{primary2})^2]^{0.5},$$

and $$P_2 = 1 - P_1.$$

These relative quantities can then be used to complete the calculation of the pure hue in box 30 by obtaining its reflectance $Y_p$:

$$Y_p = P_1 Y_{primary1} + P_2 Y_{primary2}.$$

At this point, the calculations relating to the linear mixing plane shown in FIGS. 4 and 5 are completed, so we turn now to calculations in another linear mixing plane which includes the pure hue and the two neutral coloring agents. The purpose of these calculations is to adjust the saturation and reflectance of the pure hue to obtain the matching color, as shown in box 32 in FIG. 6. Although these calculations could be performed in a number of ways, the result will preferably be a color which closely matches the original color and which, in combination with other matching colors, preserves the color characteristics of the original image. In other words, the adjustment in step 32 may be tailored to the specific image whose colors are being matched.

A major consideration in preserving the color characteristics of the original image is how to treat an original color which is outside the three-dimensional gamut of available colors. In general, the relative quantities of the two primaries which generate the pure hue do not need to be adjusted, but the quantities of the neutral coloring agents which are mixed with them must be adjusted to provide a suitable approximation of an original color outside the gamut. Mixing in neutral coloring agents will change the saturation and reflectance of the pure hue, as discussed above, but it is usually possible to change these parameters while nonetheless preserving the color characteristics of the original image. For example, if the original image has colors which are distinguishable by saturation differences, the saturation differences can be preserved across a range of available saturation values. Similarly, if the original image has colors distinguishable by reflectance, reflectance differences can be preserved. In general, an appropriate compromise between preserving saturation characteristics and preserving reflectance characteristics can be found, and one of the advantages of the invention is that saturation and reflectance can be flexibly adjusted in whatever way is appropriate to the image being produced.

Figure 10:
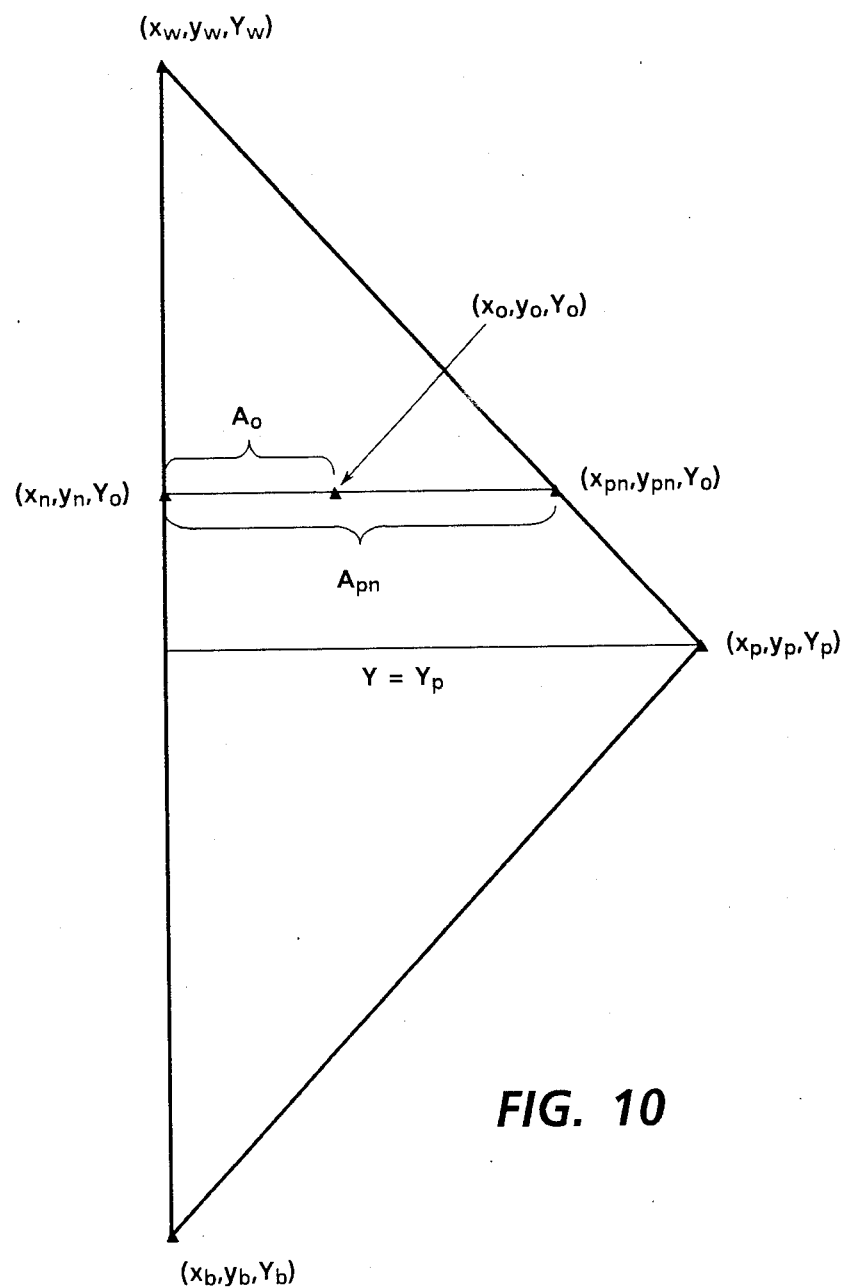
FIG. 10 is graph showing a color mixing plane in which the reflectance and saturation of a pure hue may be adjusted according to the invention.
Figure 11:
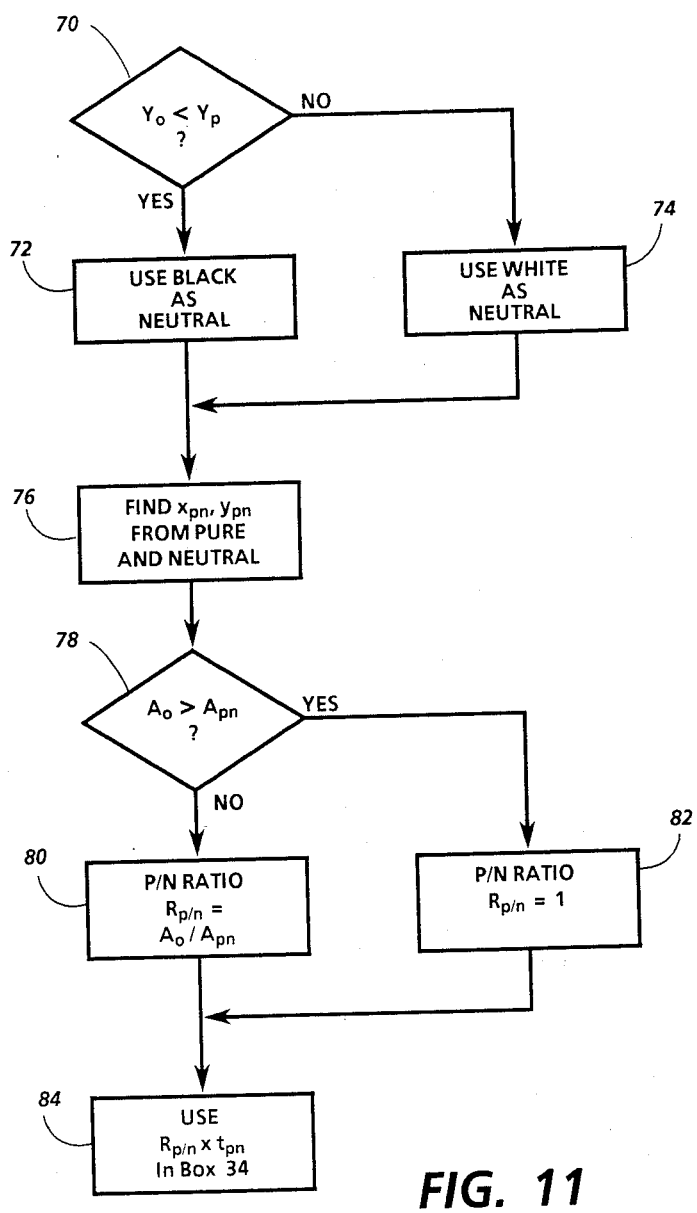
FIG. 11 is a flowchart showing one technique for adjusting reflectance and saturation in the plane of FIG. 10.

FIGS. 10 and 11 illustrate an implementation of the step in box 32 which preserves reflectance characteristics at the expense of saturation characteristics, an approach which is often useful and which may be especially desirable if the original image has many shades of colors outside the available reflectance range. FIG. 10 illustrates geometrically the linear mixing plane which includes the pure hue, at coordinates $x_p$, $y_p$, $Y_p$ and the neutral coloring agents, white at $x_w$, $y_w$, $Y_w$ and black at $x_b$, $y_b$, $Y_b$. FIG. 10 also shows the triangle defined by these three colors and two lines of constant reflectance within that triangle, one at reflectance $Y_p$ and the other at the reflectance of the original color $Y_o$. FIG. 10 shows the original color at $x_o$, $y_o$, $Y_o$ inside the triangle. The step in box 24, discussed above, may ensure that $Y_b \leq Y_o \leq Y_w$ but the original color could also fall outside the triangle and to its right in FIG. 10. The technique of FIGS. 10 and 11 adjusts the reflectance of the pure hue so that it falls on the line of constant reflectance $Y_o$. If the original color falls outside the triangle, the matching color is the most saturated available color on that line, at $x_{pn}$, $y_{pn}$, $Y_o$, but if the original color is in the triangle, the technique also adjusts the saturation of the matching color to that of the original color.

FIG. 11 shows steps implementing this technique to perform the step in box 32 in FIG. 6. In box 70, $Y_o$ and $Y_p$ are compared to determine whether the pure hue must be adjusted toward white or black to obtain reflectance $Y_o$. If $Y_o < Y_p$, black is selected as the neutral coloring agent in box 72; otherwise, white is selected in box 74. Then, in box 76, the coordinates of the pure hue and the selected neutral coloring agent are used to obtain the x,y coordinates of a pure/neutral color which is the most saturated available color with reflectance $Y_o$. These coordinates $x_{pn}$, $y_{pn}$ can be obtained from:

$$x_{pn} = x_{neutral} + t_{pn}(x_p - x_{neutral}),$$

and $$y_{pn} = y_{neutral} + t_{pn}(y_p - y_{neutral}),$$

where $$t_{pn} = (Y_o - Y_{neutral})/(Y_p - Y_{neutral}).$$

At this point, adjustment of the reflectance is complete, but saturation may still be adjusted if the original color is not outside the triangle in FIG. 10. Therefore, the test in box 78 compares $A_o$ to $A_{pn}$, shown in FIG. 10, to determine the position of the original color in relation to the pure/neutral color. This can be done by first calculating $A_o$ and $A_{pn}$ as follows:

$$A_o = \{(x_o - x_n)^2 + (y_o - y_n)^2\}0.5$$

and $$A_{pn} = \{(x_{pn} - x_n)^2 + (y_{pn} - y_n)^2\}0.5,$$

in which $x_n$, $y_n$ are the coordinates of the neutral color with the original color's reflectance, as discussed above in relation to center point selection and as shown in FIG. 10.

Then, if $A_o/A_{pn} \leq 1.0$, the comparison in box 78 yields a negative result, and the ratio $A_o/A_{pn}$ is selected in box 80 as the pure/neutral ratio $R_{p/n}$, indicating the quantity of the pure/neutral color in the matching color and thereby adjusting saturation. But if $A_o/A_{pn} > 1.0$, $R_{p/n}$ is set to 1.0 in box 82, because no adjustment of the saturation is possible. Since $R_{p/n}$ indicates the saturation adjustment of the pure hue, while $t_{pn}$ indicates the reflectance adjustment, the product of $R_{p/n}$ and $T_{pn}$ indicates the quantity of the pure hue after both adjustments. This product is used in box 84 to find the coloring agent quantities, as discussed in more detail below in relation to box 34 in FIG. 6.

Ordinarily in a printer, the white coloring agent is the white of the paper on which the other coloring agents are printed, so that the white coloring agent will be present wherever none of the other coloring agents is printed. Therefore, the only coloring agent quantities to be calculated in box 34 in FIG. 6 are those of the black coloring agent and the two primary coloring agents which mix to provide the pure hue. As shown below, the quantity of black coloring agent can be directly calculated, while the quantities of the primaries must take into account the selection of the primary color pair in box 28, since one of the primaries will be a simple CMY primary while the other will be an RGB primary formed by superimposition.

The quantity of black coloring agent $a_b$ can be directly calculated from the results of the previous calculations, as noted above. We know that the sum of all the coloring agent quantities must equal 1.0, and we also know that the reflectance of the matching color $Y_o$ must be equal to the sum of the products of each coloring agent quantity times the reflectance of that coloring agent in the linear mixing space. If we treat the pure hue as a single coloring agent, the only other coloring agents are white and black, yielding:

$$a_b + a_w + a_p = 1.0$$

and $$Y_o = a_b Y_b + a_w Y_w + a_p Y_p,$$

in which $a_b$, $a_w$ and $a_p$ are the quantities of black, white and pure coloring agents, respectively. Hardy, A. C., *Handbook of Colorimetry*, The Technology Press, MIT, 1936 sets forth equivalent color mixing formulas. Substituting $(1.0 - a_b - a_p)$ for $a_w$ in the second equation and solving for $a_b$, we obtain:

$$a_b = \{Y_o - Y_w + a_p(Y_w - Y_p)\}/(Y_b - Y_w).$$

But we know the values of $Y_o$, $Y_w$, $Y_p$ and $Y_b$, and $a_p$ is equal to the product of the pure/neutral ratio $R_{p/n}$ times $t_{pn}$, so that we can directly calculate $a_b$ using this equation.

Since the two primary coloring agents which make up the pure hue are a subtractive CMY primary and an adjacent subtractive RGB primary, the pure hue is actually generated from two of the subtractive CMY primaries. One CMY primary will be present throughout the pure hue areas, while the other CMY primary will be superimposed with the first only in the RGB primary areas. In addition, it may be necessary at this point to consider the particular characteristics of the equipment being used. Some machines have complete undercover removal for the black coloring agent, so that black does not cover the other coloring agents. Other machines, however, apply black over the CMY colors in the lower mixing triangle in FIG. 10, so that the quantities of the CMY primaries must be increased accordingly if $Y_o$ is less than $Y_p$. In general, the quantity of the first CMY primary $a_{primary1}$ is the quantity of the pure hue $a_p$. This will be true for all values of $Y_o$ if the equipment provides complete undercover removal. But if undercover removal does not occur, then if $Y_o$ is less than $Y_p$, the quantity of the first CMY primary $a_{primary1}$ is the pure/neutral ratio $R_{p/n}$, without multiplying times $t_{pn}$ as in box 84 in FIG. 11. In any case, the quantity of the second CMY primary $a_{primary3}$ is the product of the $a_{primary1}$ times the relative quantity of the RGB primary.

The relative quantity of the RGB primary is either $P_1$ or $P_2$, depending on whether it is the first or second primary, as discussed above in relation to box 30 in FIG. 6. Therefore, the quantities $a_{primary1}$ and $a_{primary3}$ can be assigned based on the first primary. If the first primary was cyan, for example, the quantity of cyan $a_c$ is $a_{primary1}$, while the quantity of yellow $a_y$ is $P_2 a_{primary1}$ and the quantity of magenta $a_m$ is zero; but if the first primary was blue, $a_c$ still equals $a_{primary1}$, but $a_y = 0$ and $a_m = P_1 a_{primary\,1}$. If the first primary was green, $a_y = a_{primary1}$, $a_c = P_1 a_{primary1}$ and $a_m = 0$; if the first primary was yellow, $a_y = a_{primary1}$, $a_c = 0$ and $a_m = P_2 a_{primary1}$; if the first primary was red, $a_m = a_{primary1}$, $a_y = P_1 a_{primary1}$ and $a_c = 0$; and if the first primary was magenta, $a_m = a_{primary1}$, $a_y = 0$ and $a_c = P_2 a_{primary1}$. This completes the determination of coloring agent quantities.

The step in box 36 selects a pattern for application of the coloring agents which will most closely match the coloring agent quantities calculated in box 34, taking into account the operation of the equipment which applies the coloring agents. As noted above, the patterns produced by a piece of equipment should be relatively stable over time, so that it will be worthwhile to have a table indicating the percentages of area coverage for each available pattern on that equipment. To the extent that the pattern depends on whether a specific area has a coloring agent applied to it or the white coloring agent in the paper is left exposed, it may be necessary in preparing such tables to treat the area coverage of white differently than the other coloring agents. If the equipment applies dots, for example, the dots may be larger than the spacing between dot centers, so that dots may overlap, resulting in non-linear area coverage with increasing dot density. Therefore, it is generally preferable to determine the area coverage for each dot pattern independently, as discussed below in relation to creating area coverage tables. It would also be possible to take into account the differences between the coloring agents other than white, but those differences are likely to be small enough to be negligible for most purposes.

In box 36, the pattern whose area coverages most closely match the coloring agent quantities is selected by an appropriate comparison algorithm. From the above discussion, it is apparent that $a_b$, $a_{primary1}$ and $a_{primary3}$ are sufficient to specify the coloring agent quantities. Therefore, these quantities can be compared with the area coverage percentages of the available patterns to find a pattern which provides approximately the appropriate coloring agent quantities. For completeness, however, it would be necessary to know the area coverage percentages of all available patterns, a formidable task in view of the tremendous number of permutations and combinations of quantities of coloring agents. Therefore, it is desirable to find a simpler approach to this comparison.

In simplifying the comparison, it is helpful to recognize that the separate pattern for each coloring agent can ordinarily be treated independently of the other coloring agents with which it is mixed to obtain a combined pattern. Therefore, it is usually satisfactory to compare each of the three quantities $a_b$, $a_{primary1}$ and $a_{primary3}$ with the area coverage percentages of the available patterns for the corresponding coloring agent to find the closest pattern for that coloring agent. The three separate patterns chosen in this way can then be combined in a single pattern to obtain the matching color. The effectiveness of this approach depends on choosing patterns for different coloring agents which result in the desired interaction effects. Although there will be some interaction between the separate patterns of different coloring agents, the effects of interaction can be reduced so that they are less than the actual variation within each pattern or increased to obtain superimposition of coloring agents. For example, one set of patterns can be selected to be used for the CMY primaries, with another used for black, so that the black patterns have minimal interaction with any of the CMY primaries, but so that the two CMY primaries have maximal interaction to obtain an RGB primary in the area where both are applied. A technique for obtaining the area coverage percentage for each such pattern is discussed in greater detail below in relation to creating area coverage tables.

By analyzing the area coverage percentages of the patterns, a set of patterns can be selected which will obtain a given level of accuracy in color matching. If the coloring agent quantities need only match the area coverage percentages to a given level of accuracy, then the patterns may be selected so that the differences between their area coverage percentages are just small enough to ensure that level of accuracy.

Finally, the selected combined pattern of coloring agents is applied to generate the matching color, in box 38. It would also be appropriate, of course, to store a representation of the combined pattern in memory together with all the other patterns making up a complete image, and then generate the entire image at some later time.

The method of color matching described above may be performed on many types of equipment. We turn now to an apparatus which matches color according to the invention and can be used in a priner, for example.

C. Color Matching Apparatus

Figure 12:
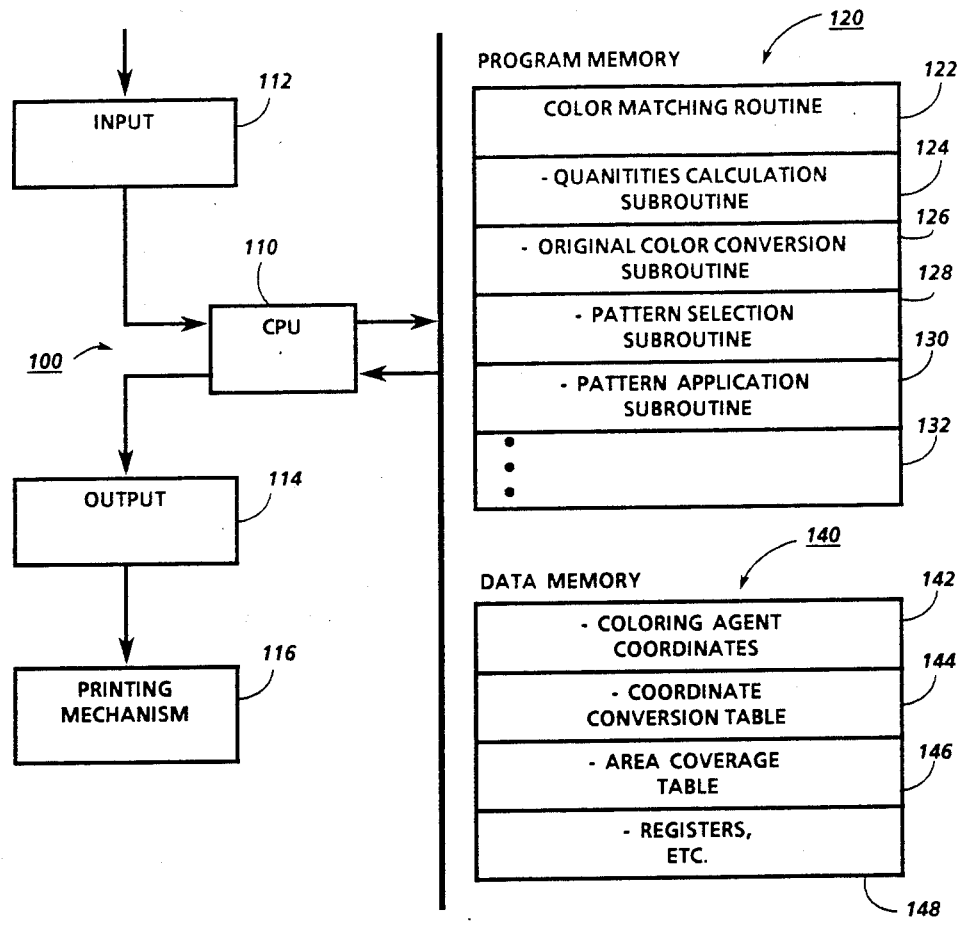
FIG. 12 is a block diagram showing the components of a color matching apparatus according to the invention.

FIG. 12 is a functional block diagram showing the components of a color matching apparatus 100 according to the invention. Apparatus 100 may also perform other control functions within a priner or other image producing equipment, but the components shown generally relate to the function of generating a color which matches an original color.

FIG. 12 shows apparatus 100 centered around central processing unit (CPU) 110 which receives data through an input 112 and provides data through an output 114 to a printing mechanism 116 or other color producing equipment. CPU 110 may be any appropriate processor, such as a microprocessor. During operation, CPU 110 executes instructions retrieved from program memory 120 and retrieves and stores data in data memory 140.

Program memory 120 illustratively includes color matching routine 122 during the execution of which CPU 110 operates according to the present invention. Color matching routine 122 calls a number of subroutines which correspond to functions described above in relation to the method of the invention. These include quantities calculation subroutine 124, original color conversion subroutine 126, pattern selection subroutine 128 and pattern application subroutine 130. In addition, of course, program memory 120 includes other programs which CPU 110 executes to perform functions other than color matching. CPU 110 may, for example, control all the functions of printing mechanism 116.

Data memory 140 illustratively includes coloring agent coordinates 142, coordinate conversion table 144, area coverage table 146, and additional data memory 148 including registers and other data permitting CPU 110 to execute instructions from program memory 120. Coloring agent coordinates 142, as discussed above in relation to Table 1, are previously measured and stored. Similarly, coordinate conversion table 144 is a standard table for converting coordinates used to generate a CRT color display to linear mixing coordinates. Area coverage table 146, which may be generated in the manner described below, should reflect the characteristics of printing mechanism 116 and the toners being used.

During execution of color matching routine 122, CPU 110 receives the original color's coordinates through input 112 or retrieves previously calculated or received original color coordinates from additional data memory 148. In executing original color conversion subroutine 126, CPU 110 retrieves the original color's linear mixing coordinates from coordinate conversion table 144. In executing quantities calculation subroutine 124, CPU 110 retrieves coloring agent coordinates 142 and uses them to calculate coloring agent quantities. During pattern selection subroutine 128, CPU 110 compares the calculated quantities with the stored area coverages of available patterns to find the pattern most closely approximating the calculated quantities. And during pattern application subroutine 130, CPU 110 performs conventional techniques for distributing dots within a printed area in accordance with the selected pattern, such as dithering or half-toning. In general, CPU 110 will follow the steps discussed above in relation to the method of the invention.

Area coverage table 146 provides one available technique for selecting the pattern of coloring agents which will most closely approximate the quantities of coloring agents in the matching color. Other techniques are available, including calculation of area coverage based on an appropriate algorithm, but area coverage table 146 is an extremely fast way of finding the most closely matching pattern. We turn now to a technique for creating the area coverage table 146.

D. Area Coverage Table Creation

If the coloring agent quantities are correctly determined, and if a pattern of coloring agents is applied which is substantially the same as those quantities, then the resulting color will match the original color. Therefore, the selection of the pattern which most closely approximates the coloring agent quantities is important in successful color matching. For the selection to be accurate, the comparison of the quantities with the patterns must be properly performed, and this also requires that the appropriate data about the patterns be available for comparison. The area coverage table is created to provide that data.

It is helpful to consider briefly the data about the patterns which is desirable in making a comparison with the coloring agent quantities. A colorimeter could be used to find CIE coordinates for a number of patterns of the coloring agents, but CIE coordinates cannot readily be compared with coloring agent quantities. Furthermore, a change in one of the coloring agents would invalidate the CIE coordinates for many of the patterns, leading to one of the problems which the present invention solves, namely the need to recreate an entire table or matrix each time a coloring agent's color changes.

This aspect of the present invention is based on the discovery that, rather than comparing the coloring agent quantities with a pattern's CIE coordinates, it is more appropriate to compare them with the areas covered by the coloring agents in that pattern. If the area coverages of the coloring agents in the pattern are the same or nearly the same as the coloring agent quantities, the pattern generates the matching color.

The technique of creating an area coverage table according to the invention begins with the printing of a number of available patterns of one of the coloring agents. The patterns which are printed should cover the range of desired area coverage from a blank pattern with zero area covered to a solid pattern with complete coverage. Then, the CIE coordinates of each printed pattern are measured using a colorimeter.

The measured reflectance values thus range from the reflectance $Y_{min}$ for the solid pattern to the reflectance $Y_{max}$ for the blank pattern, which will ordinarily be the reflectance of the paper. These values are then used to estimate the area coverage for each pattern. The area coverage $A_i$ for the ith pattern with measured reflectance $Y_i$ can be estimated as follows:

$$A_i = (Y_{max} - Y_i)/(Y_{max} - Y_{min}).$$

The estimated value of $A_i$ may be adequate for purposes of comparison with the coloring agent quantities, in which case an appropriate group of patterns providing the desired level of resolution can be selected for inclusion in the area coverage table.

Figure 13:
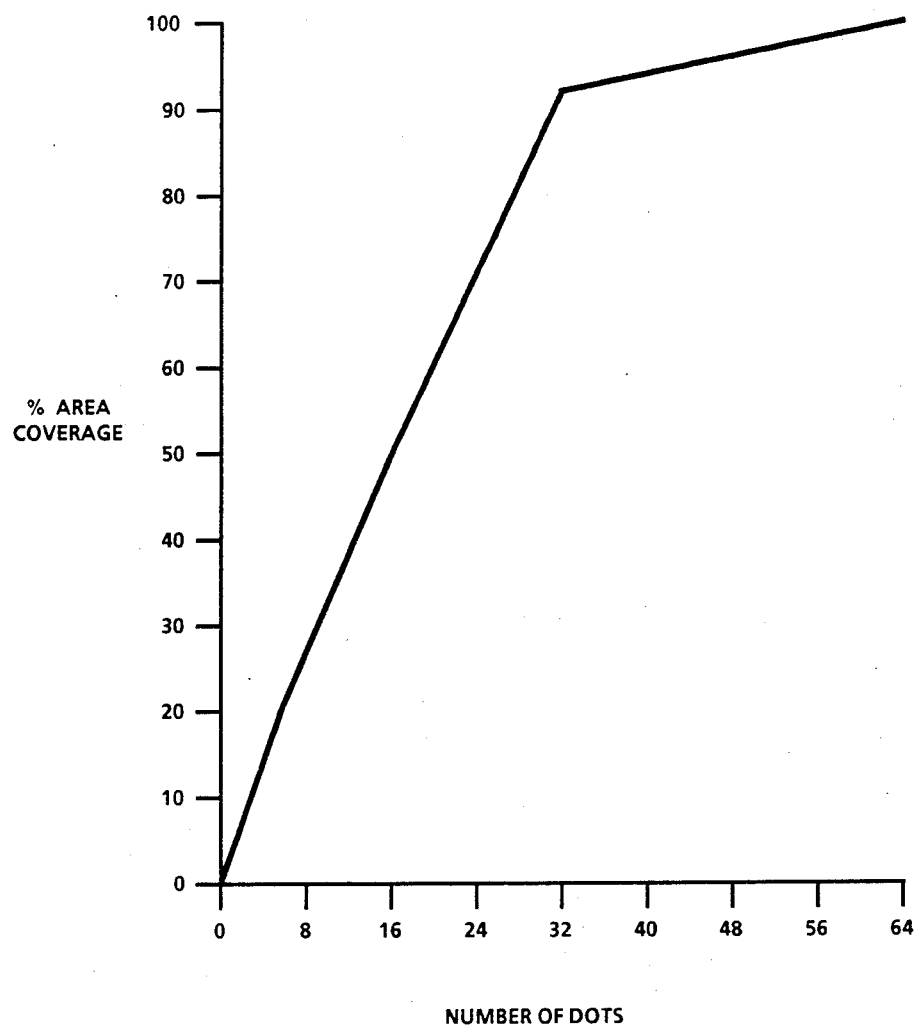
FIG. 13 is a graph showing the mathematical relationship between number of dots and area coverage percentage for a Bayer pattern.

If the estimated values of $A_i$ are not adequate due to measurement errors, the estimated values can be mathematically corrected. Mathematical correction can reduce errors introduced by the measurement process, because the number of colored dots in a pattern should bear a predictable mathematical relation to the area coverage. FIG. 13 shows graphically the mathematical relationship between the number of dots and the area coverage percentage of a Bayer pattern, for example, and a similar relationship should be obtainable for any set of patterns. The mathematical correction process should involve curve fitting and smoothing of the area coverages calculated from the measured reflectance values so that they follow a curve more closely resembling the expected mathematical relationship for the patterns being used. In other words, some of the calculated area coverage values are corrected based on the values calculated for other patterns. Conventional techniques for curve fitting and smoothing are appropriate for this correction process.

The table of patterns derived from printing each coloring agent separately in this manner is easy to create and also facilitates comparison with coloring agent quantities. On the other hand, it may be necessary to use more complicated techniques in creating a table. For example, the area coverages could first be estimated based on a mathematical model of the relationship between number of dots and area coverage percentage, after which measurements of actual area coverage could be made to correct the estimates, if necessary.

The total number of possible patterns on a given printer may be extremely large, so that an important aspect of creating the area coverage table is to select a group of patterns which is small enough to be manageable, but large enough to provide a satisfactory approximation to any set of quantities of coloring agents. For an electrostatic printer at 200 dots per inch and $8 \times 8$ patterns, about 36–40 patterns should suffice, but at 400 dots per inch and $16 \times 16$ patterns, 60–100 patterns will be needed. Similarly, 60–100 patterns will be needed for a thermal printer at 300 dots per inch and $16 \times 16$ patterns. The technique described above can be used to select a group of patterns meeting the color resolution criteria of the printer or other color producing equipment.

E. Miscellaneous

The color matching technique of the invention has been compared with other color matching techniques, including a conventional half tone method and a Bayer $4 \times 4$ dither method. The Macbeth ColorChecker defined the original colors. The invention proved superior to the other techniques, producing colors nearly identical to the originals while the other techniques did not. The Munsell color chart revealed, however, that the color matching technique of the invention accurately matches all colors except for low chroma or nearly achromatic colors, in which shifts in hue occur. These shifts result, however, not from a weakness in the technique but from the coarseness of the available patterns of coloring agents, which do not allow adjustment when the quantity of a color to be applied is less than the area coverage percentage of a single dot. Therefore, this can be solved by providing finer patterns in which each dot has a smaller area coverage percentage. For a new set of patterns, of course, it will be necessary to recalculate the area coverage percentage of each available pattern.

The technique of the invention has been discussed in relation to converting CRT colors based on additive RGB phosphors into printed colors based on subtractive CMY toners, but is equally applicable to any other color matching problem. For example, instead of RBG color coordinates, HLS or LUV coordinates could be received and converted into coordinates in a linear mixing color space from which coloring agent quantities could then be determined. Colors printed on an electrostatic printer could be matched to thermally printed colors, and printed colors could be matched on a CRT display.

The technique of the invention may be readily modified for the particular color matching task at hand. For instance, in color matching RGB coordinates developed to generate CRT colors, it is sometimes found that the reflectances of the original colors after conversion to CIE coordinates typically exceed the reflectance of the white coloring agent to be applied. This problem can be solved by scaling the reflectance values so that they all fit between the reflectances of the white and black coloring agents.

Many other variations and modifications will be apparent to those skilled in the art. The invention is not limited to the specific embodiments described above and shown in the drawings, but only by the appended claims.

What is claimed:

1. A method comprising:
   determining quantities of primary coloring agents to generate a hue approximating that of an original color; and
   determining a quantity of at least one neutral coloring agent to adjust the hue so that the determined coloring agent quantities can be used to generate a color approximating the original color.

2. The method of claim 1, further comprising:
   determining quantities of original coloring agents which generate the original color; and
   determining linear mixing coordinates of the original color based on the quantities of original coloring agents which generate the original color;
   the step of determining quantities of primary coloring agents comprising using the linear mixing coordinates of the original color and linear mixing coordinates of at least two of the primary coloring agents;
   the step of determining the neutral coloring agent quantity comprising using the linear mixing coordinates of the original color and linear mixing coordinates of at least one neutral coloring agent.

3. The method of claim 2 in which the original coloring agents are additive RGB coloring agents, the step of determining quantities of original coloring agents comprising obtaining quantities of the additive RGB coloring agents, the step of determining the original color's coordinates comprising converting the obtained quantities of additive RGB coloring agents into coordinates in CIE color space.

4. The method of claim 2 in which the step of determining quantities of primary coloring agents further comprises using two-dimensional linear mixing coordinates of the original color and of at least two of the primary coloring agents.

5. The method of claim 1 further comprising selecting a pattern which closely approximates the determined quantity of each coloring agent and applying the coloring agents in the pattern.

6. The method of claim 5 in which the substep of selecting the pattern comprises, for each coloring agent to be applied, selecting from a set of available separate patterns of that coloring agent a separate pattern which most closely approximates the determined quantity of that coloring agent; the step of selecting the pattern further comprising combining the selected separate patterns for all of the coloring agents to be applied into a combined pattern of coloring agents which closely approximates the determined quantity of each coloring agent.

7. The method of claim 5, further comprising storing an area coverage value for each of a set of available coloring agent patterns, the step of selecting the pattern comprising comparing the determined quantity of each coloring agent with stored area coverage values of the available coloring agent patterns which include that coloring agent to find the available pattern whose stored area coverage value most closely approximates the determined quantity of that coloring agent.

8. The method of claim 7 in which the step of storing an area coverage value for each of the available patterns comprises measuring the reflectance of each of the available patterns and calculating an area coverage value for each pattern based on its measured reflectance.

9. The method of claim 8 in which the step of storing an area coverage value further comprises correcting the calculated area coverage value for at least one of the available patterns based on the calculated area coverage values for other available patterns.

10. A method comprising:
performing linear mixing calculations with an original color's linear mixing coordinates and linear mixing coordinates of at least two primary coloring agents and at least one neutral coloring agent to determine quantities of the coloring agents to be used to generate a color approximating the original color.

11. The method of claim 10, further comprising determining the linear mixing coordinates of the original color and of the coloring agents prior to the step of performing linear mixing calculations.

12. The method of claim 10 in which the step of performing linear mixing calculations comprises performing two-dimensional linear mixing with linear mixing coordinates of the original color and the primary coloring agents to obtain linear mixing coordinates of a hue approximating that of the original color.

13. The method of claim 10 in which the step of determining coordinates comprises using quantities of original coloring agents which generate the original color to find the original color's linear mixing coordinates.

14. The method of claim 13 in which the quantities of original coloring agents are quantities of additive RGB color agents, the linear mixing color space is the CIE color space, and the substep of using the quantities to find the coordinates comprises converting the RGB quantities into CIE coordinates.

15. The method of claim 10, further comprising selecting the at least two primary coloring agents from six primary coloring agents, the six primary coloring agents including three subtractive CMY coloring agents and three subtractive RGB coloring agents generated from the subtractive CMY coloring agents.

16. The method of claim 10, further comprising selecting the at least two primary coloring agents from at least three primary coloring agents.

17. The method of claim 16 in which the step of performing linear mixing calculations further comprises calculating relative quantities of the selected primary coloring agents which will generate a hue approximating that of the original color.

18. The method of claim 17 in which the step of performing linear mixing calculations further comprises calculating relative quantities of the hue and of at least one neutral coloring agent which will adjust the saturation and reflectance of the hue to generate a color approximating the original color.

19. The method of claim 18 in which the substep of calculating relative quantities of the hue and at least one neutral coloring agent comprises calculating relative quantities so that the color approximating the original color, when included in an image with other colors similarly generated to approximate colors in the original image containing the original color, will preserve color characteristics of the original image.

20. The method of claim 18 in which the step of performing linear mixing calculations further comprises calculating actual quantities of the primary coloring agents and the neutral coloring agent from the relative quantities.

21. The method of claim 16, in which the coordinates of the at least three primary coloring agents define a polygon, the method further comprising selecting linear mixing coordinates of a center point within the polygon, the step of selecting primary coloring agents comprising selecting two of the at least three primary coloring agents whose coordinates define vertices at ends of a side of the polygon which intersects a line projecting from the center point's coordinates through the original color's linear mixing coordinates.

22. The method of claim 21 in which the step of performing linear mixing calculations further comprises calculating relative quantities of the selected primary coloring agents based on lengths of parts of the side of the polygon.

23. The method of claim 22 in which the step of performing linear mixing calculations further comprises calculating relative quantities of a mixture of the selected primary coloring agents and of at least one neutral coloring agent based on lengths of parts of the projecting line.

24. The method of claim 21 in which the step of selecting coordinates of the center point comprises selecting the linear mixing coordinates of a neutral color along a neutral linear mixing line between coordinates of two neutral coloring agents, the natural color having a reflectance equal to that of the original color.

25. The method of claim 12 in which the substep of performing two-dimensional linear mixing comprises determining quantities of the primary coloring agents to be applied to generate the hue.

26. The method of claim 12 in which the step of performing linear mixing calculations further comprises performing two-dimensional linear mixing with linear mixing coordinates of the hue and the neutral coloring agent to determine a neutral coloring agent quantity to adjust the hue to obtain the color approximating the original color.

27. The method of claim 26 in which the substep of performing two-dimensional linear mixing with coordinates of the hue and the neutral coloring agent comprises adjusting the hue's reflectance to be equal to the original color's reflectance.

28. The method of claim 26 in which the substep of performing two-dimensional linear mixing with coordinates of the hue and the neutral coloring agent comprises adjusting the hue's saturation to be equal to the original color's saturation.

* * * * *